United States Patent
Wellman (10) Patent No.: US 6,952,682 B1
(45) Date of Patent: Oct. 4, 2005

(54) SYSTEM AND METHOD FOR MATCHING MULTI-ATTRIBUTE AUCTION BIDS

(75) Inventor: Michael P. Wellman, Ann Arbor, MI (US)

(73) Assignee: Ariba, Inc., Sunnyvale, CA (US)

(*) Notice: Subject to any disclaimer, the term of this patent is extended or adjusted under 35 U.S.C. 154(b) by 0 days.

(21) Appl. No.: 09/347,110

(22) Filed: Jul. 2, 1999

(51) Int. Cl.⁷ .............................................. G06F 17/60
(52) U.S. Cl. ............................ 705/37; 705/1; 705/500; 705/35; 395/140
(58) Field of Search ................................. 705/1, 50, 80, 705/35–45, 26, 28; 395/140

(56) References Cited

U.S. PATENT DOCUMENTS

| | | | |
|---|---|---|---|
| 3,581,072 A | 5/1971 | Nymeyer | |
| 4,789,928 A | 12/1988 | Fujisaki | |
| 5,101,353 A | 3/1992 | Lupien et al. | |
| 5,136,501 A | 8/1992 | Silverman et al. | |
| 5,319,542 A | 6/1994 | King, Jr. et al. | |
| 5,603,034 A | 2/1997 | Swanson | |
| 5,615,109 A | 3/1997 | Eder | |
| 5,689,652 A | 11/1997 | Lupien et al. | |
| 5,727,165 A | 3/1998 | Ordish et al. | |
| 5,745,765 A | 4/1998 | Paseman | |
| 5,774,873 A | 6/1998 | Berent et al. | |
| 5,794,207 A | 8/1998 | Walker et al. | |
| 5,794,219 A | 8/1998 | Brown | |
| 5,799,284 A | 8/1998 | Bourquin | |
| 5,812,572 A | 9/1998 | King et al. | |
| 5,812,668 A | 9/1998 | Weber | |
| 5,835,896 A | 11/1998 | Fisher et al. | |
| 5,841,958 A | * 11/1998 | Buss et al. .................. | 345/440 |
| 5,844,554 A | 12/1998 | Geller et al. | |
| 5,845,266 A | 12/1998 | Lupien et al. | |
| 5,862,223 A | 1/1999 | Walker et al. | |
| 5,873,071 A | 2/1999 | Ferstenberg et al. | |
| 5,890,137 A | 3/1999 | Koreeda | |
| 5,890,138 A | 3/1999 | Godin et al. | |
| 5,905,975 A | 5/1999 | Ausubel | |

(Continued)

FOREIGN PATENT DOCUMENTS

| | | |
|---|---|---|
| EP | 1 077 422 A2 | 2/2001 |
| JP | 0296082 A | 11/1995 |
| WO | WO 00/79463 A1 | 12/2000 |
| WO | WO 01/79961 A2 | 10/2001 |

OTHER PUBLICATIONS

U.S. Provisional application No. 60/097,933, Pallakoff, filed Aug. 18, 1998.

(Continued)

*Primary Examiner*—John W. Hayes
*Assistant Examiner*—Kambiz Abdi
(74) *Attorney, Agent, or Firm*—Blakely, Sokoloff, Taylor & Zafman LLP (57) ABSTRACT

A system and a method for matching multi-attribute auction bids are disclosed. A set of multi-attribute bids or bid values are collected from one or more buyers and one or more sellers. The set of bid values may include variances from nominal bid values. Buyer and seller bids are generated from the set of buyer and seller multi-attribute bid values after predetermined attribute values, if any, are added. A pair of bids between each buyer and each seller having a highest surplus is selected. The method generates a weighted bipartite graph having buyer nodes and seller nodes and an edge between each buyer node and each seller node, each edge having the highest surplus of the pair of bids between the buyer and seller as a weight. The maximal weighted matching bids from the highest surplus pairs of bids are determined using the weighted bipartite graph.

30 Claims, 9 Drawing Sheets

U.S. PATENT DOCUMENTS

| | | | |
|---|---|---|---|
| 5,913,210 A | | 6/1999 | Call |
| 5,950,001 A | | 9/1999 | Hamilton et al. |
| 5,966,699 A | | 10/1999 | Zandi |
| 6,014,643 A | | 1/2000 | Minton |
| 6,044,361 A | * | 3/2000 | Kalagnanam et al. ......... 705/28 |
| 6,055,518 A | | 4/2000 | Franklin et al. |
| 6,085,169 A | | 7/2000 | Walker et al. |
| 6,101,484 A | | 8/2000 | Halbert et al. |
| 6,131,087 A | * | 10/2000 | Luke et al. ................... 705/26 |
| 6,146,272 A | | 11/2000 | Walker et al. |
| 6,269,343 B1 | | 7/2001 | Pallakoff |
| 6,285,989 B1 | | 9/2001 | Shoham |
| 6,405,180 B2 | | 6/2002 | Tilfors et al. |
| 6,449,601 B1 | | 9/2002 | Friedland et al. |

OTHER PUBLICATIONS

U.S. Provisional application No. 60/097,932, Pallakoff, filed Aug. 21, 1998.

Sairamesh, J., "Economic Framework for Pricing and Charging in Digital Libraries," D–Lib Magazine, ISSN 1082–9873, Feb. 1996.

Marrinucci, Sandra, "Net Proves a Boon for Research," Electronic Engineering Times, Sep. 22, 1997.

Bailey, Joseph P. and Bakos, Yannis, "An Exploratory Study of the Emerging Role of Electronic Intermediaries," International Journal of Electronic Commerce, vol. 1, No. 3, Spring 1997, pp. 7–20.

Negroponte, Nicholas, "Psst! Transactions," Forbes, 80th Issue, Jul. 7, 1997.

Ferranti, Marc, "Electronic Commerce: Ties That Bind," InfoWorld, vol. 9, No. 14, Apr. 7, 1997, pp. 59–62.

Search Report dated Oct. 18, 1999m 3 pgs.

ONSALE, About ONSALE, 1996, 2 pgs.

ONSALE, Auction Formats, 1996, 2pgs.

ONSALE, Auction Supersite, Sep. 8, 1997, 7 pgs.

ONSALE, Home, Sep. 8, 1997, 4 pgs.

CURRENT Catalog, Christmas Wishes 1991, 4 pgs.

Frook, John Evan, Packaged apps give auctioneers rich new options, Internetweek, May 25, 1998. Issue 716, p. 14, 4/7 p. 2 graphs, 2 pgs.

Trommer, Diane Moai Intros Auction Software, Electronic Buyer's News, Mar. 23, 1998, Issue 1101, p. 78, 1/4p, 2 pgs.

Wilder, Clinton, Auctions for Business, Information Week, Mar. 16, 1998, Issue 673, p. 90, 2/3p. 1c., 2 pgs.

Millman, Howard, "Legacy Data Links Shrink Costs" Info. World, Jan. 5, 1998, vol. 20, Issue 1, p. 51, 2p, 1 chart, 1c, 4 pgs.

Opensite Technologies Introduces Innovative Web Auction Partner Program, Business Wire Page, 08041472, 3 pages, Aug. 4, 1998.

Mase, K., et al., Scripting Method Based on Temporal Intervals for Designing Interactive Systems, Transactions of the Information Processing Society of Japan, vol. 39, Issue 5 p 1403–13, 2 pgs.,May 1, 1998.

Emaze Software Offers WebThread, ScriptWizard on Buy-Direct.com, Business Wire Page: 12120089, 3 pgs. Dec. 12, 1996.

Cohen, Emily, Going . . . Going . . . Gone! (Fairmarket's Web Auction Site, and Emaze Software's.

Search Report for PCT/US00/15982, mailed Aug. 23, 2000; 6pgs.

International Preliminary Examination Report for PCT/US99/17248 dated Apr. 27, 2001, 6 pages.

Search Report for PCT /US00/17449, mailed Nov. 14, 2000 4 pages.

International Preliminary Examination Report for PCT/US00/15982 mailed May 8, 2001, 6 pages.

Written Opinion for PCT/US00/17449 dated Apr. 25, 2001, 7 pages.

Lal, Rajiv, et al.; An Approach For Developing An Optical Discount Pricing Policy; Management Science, vol. 30, No. 12, Dec., 1984, pp. 1524–1539; the Institute of Management Sciences.

Ravindra K. Ahuja, et al., "Network Flows: Theory, Algorithms, and Applications," Prentice Hall, Inc., pp. v–x, 461, 470–473, and 509 (1993).

Martin Bichler, et al., "Multi–attribute auctions for electronic procurement," In IBM/IAC Workshop on Internet–Based Negotiation Technology, Yorktown Heights, NY, pp. 1–13 (Mar. 1999).

Fernando Branco, "The Design of Multidimensional Auctions," RAND Journal of Economics, vol. 28, No. 1, pp. 63–81 (Spring 1997).

Yeon–Koo Che, "Design competition through multidimensional auctions," RAND Journal of Economics, vol. 24, No. 4, pp. 668–680 (Winter 1993).

W.M. Gorman, "The Structure of Utility Functions," Review of Economic Studies, vol. 35, No. 4, pp. 367–390 (Oct. 1968).

Robert H. Guttman, et al., "Agent–mediated Integrative Negotiation for Retail Electronic Commerce," In Agents–98 Workshop on Agent–Mediated Electronic Trading, Minneapolis, MN, pp. 1–13 (1998).

Ralph L. Keeney, et al:, "Decisions with Multiple Objectives: Preferences and Value Tradeoffs," New York, John Wiley & Sons, pp. ii–x, 66–130, and 219–435 (1993).

* cited by examiner

| ATTRIBUTE | NOMINAL VALUE | VARIANCES |
|---|---|---|
| QUALITY 1 | 5 | -1: +10, MAX OF +20<br>6 : -20 |
| QUALITY 2 | 7 | 8, 9: +5<br>$\geq 10$: +9 |
| TIME | AFTER 9/15/99 AND ON OR BEFORE 10/11/99 | 10/12/99 - 10/15/99: -8 |
| DELIVERY | SAN FRANCISCO | CHICAGO : -20<br>OTHER U.S. CITIES: -25 |
| SELLER RELIABILITY | 3 | |
| $A_1$ | X | $X_1$: +4<br>$X_2$: -3 |
| $A_2$ | Y | |
| $A_3$ | Z | |
| PRICE | 100 | MINIMUM 70<br>MAXIMUM 150 |

FIG. 3

| ATTRIBUTE | NOMINAL VALUE | VARIANCES |
|---|---|---|
| QUALITY 1 | 5 | 0 |
| QUALITY 1 | 6 | -20 |
| QUALITY 1 | 4 | +10 |
| QUALITY 1 | 1, 2, OR 3 | +20 |
| QUALITY 2 | 7 | 0 |
| QUALITY 2 | 8, 9 | +5 |
| QUALITY 2 | $\geq 10$ | +9 |
| TIME | AFTER 9/15/99 AND ON OR BEFORE 10/11/99 | 0 |
| TIME | 10/12/99 - 10/15/99 | -8 |
| DELIVERY | SAN FRANCISCO | 0 |
| DELIVERY | CHICAGO | -20 |
| DELIVERY | OTHER U.S. CITIES | -25 |
| SELLER RELIABILITY | 3, 4, OR 5 | 0 |
| $A_1$ | X | 0 |
| $A_1$ | $X_1$ | +4 |
| $A_1$ | $X_2$ | -3 |
| $A_2$ | Y | 0 |
| $A_3$ | Z | 0 |
| BUYER CREDIT RATING | 6 | 0 |
| PRICE | 100 | 70 TO 150 |

SYSTEM AND METHOD FOR MATCHING MULTI-ATTRIBUTE AUCTION BIDS

BACKGROUND OF THE INVENTION

1. Field of the Invention

The present invention relates generally to a system and method for managing an auction. More specifically, a system and method for matching multi-attribute auction bids to maximize an overall surplus are disclosed.

2. Description of Related Art

In many conventional auctions, both online and off, an auction mechanism manages negotiations between a single seller and multiple buyers, for example, for a particular good or service in a given transaction. The good or service is typically completely defined such that price of the good or service is the only variable and thus the only negotiable attribute.

The use of online auctions as a dynamic pricing mechanism for purchasing and selling goods and services has recently experienced a significant boom, resulting in the creation of new commerce channels. Online auctions offer real-time, on-the-fly matching of prices to market conditions while, to a large extent, eliminating barriers of time and geography.

In some cases, a buyer and/or a seller may wish to negotiate non-price attributes of the good or service, particularly in business-to-business transactions. The price of the good or service may be dependent at least in part upon these non-price attributes. Such multi-attribute negotiation or auction may be particularly useful and beneficial in, for example, procurement transactions. Further, such multi-attribute or multidimensional negotiation or auction may be among multiple sellers and multiple buyers. However, conventional online auction mechanisms do not provide for collection of multi-attribute bids from buyers and sellers nor do they provide for optimal clearing of such multi-attribute buyer and seller bids.

What is needed is a system and method for allowing systematic and simultaneous negotiation in multiple dimensions. It is desirable to provide a system and method for collecting multi-attribute bids from buyers and sellers. Ideally, each attribute of the bid collected from buyers and sellers is specified in relation to a uniform quantification unit. It is further desirable to provide a system and method for automated clearing of the multi-attribute buyer and seller bids to result in an optimal matching of buyer and seller bids.

SUMMARY OF THE INVENTION

A system and method for matching multi-attribute auction bids to achieve an overall optimal matching of seller and buyer bids are disclosed. The system and method provide for collection of multi-attribute bids from buyers and sellers and for automated clearing of the bids to result in an optimal matching of buyer and seller bids. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method of matching at least one multi-attribute bid from one or more buyers and at least one multi-attribute bid from one or more sellers generally comprises selecting a pair of bids having a highest surplus between each buyer and each seller, generating a weighted bipartite graph comprising buyer nodes and seller nodes and an edge between each buyer node and each seller node, each edge having the highest surplus of the pair of bids between the buyer and seller as a weight, and determining maximal weighted matching bids from the highest surplus pairs of bids using the weighted bipartite graph.

Preferably, each buyer or seller is associated with at most one maximal weighted matching bid. In one embodiment, selecting the highest surplus pair of bids includes determining a value associated with each bid of a buyer and each bid of a seller. The highest surplus of a pair of bids between each buyer and each seller may be a highest difference between the value of each bid of the buyer and the value of each bid of the seller.

In another embodiment, the method may include collecting at least one multi-attribute bid from one or more buyers and at least one multi-attribute bid from one or more sellers, each bid having a plurality of attributes specified by a buyer or seller. Each bid may also include one or more predetermined attributes, such as buyer credit rating or seller reliability. The plurality of attributes are preferably specified relative to a uniform measurement unit, such as a monetary unit.

According to another embodiment, each bid has a price associated therewith, preferably expressed in terms of the uniform measurement unit. Selecting the highest surplus pair of bids between each buyer and each seller may include determining a difference between the price of each buyer bid and the price of each seller bid.

In yet another embodiment, a dynamic trading method comprises collecting at least one set of multi-attribute bid values from one or more buyers and at least one set of multi-attribute bid values from one or more sellers, generating buyer bids from the set of buyer multi-attribute bid values and seller bids from the set of seller multi-attribute bid values, and selecting a pair of compatible bids between each buyer and each seller, the pair of bids having a highest difference in bid values.

A method of generating multi-attribute bids is also disclosed. The method comprises collecting at least one set of multi-attribute bid values, each set having a set of nominal attribute values including a nominal bid value and at least one variance to the nominal attribute value of at least one attribute and a corresponding variance relative to the nominal bid value. The method may further include generating a set of bids for each set of multi-attribute bid values, each bid having a different combination of attribute values based on corresponding variances and nominal attribute values, and generating a bid value for each bid based upon the combination of attribute values. The method may also include collecting at least one set of multi-attribute bid values from a buyer and collecting at least one set of multi-attribute bid values from a seller, the buyer and seller having a same set of attributes. At least one of the attributes may be a predetermined buyer attribute and/or a predetermined seller attribute. Further, the method may include collecting a bid value limit such as a minimum bid value and/or a maximum bid value such that bids having a bid value outside of the bid value limit may be discarded.

Computer program products for implementing the methods described herein are also disclosed.

These and other features and advantages of the present invention will be presented in more detail in the following detailed description and the accompanying figures which illustrate by way of example the principles of the present invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for matching multi-attribute auction bids to achieve an overall optimal matching of seller and buyer bids are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
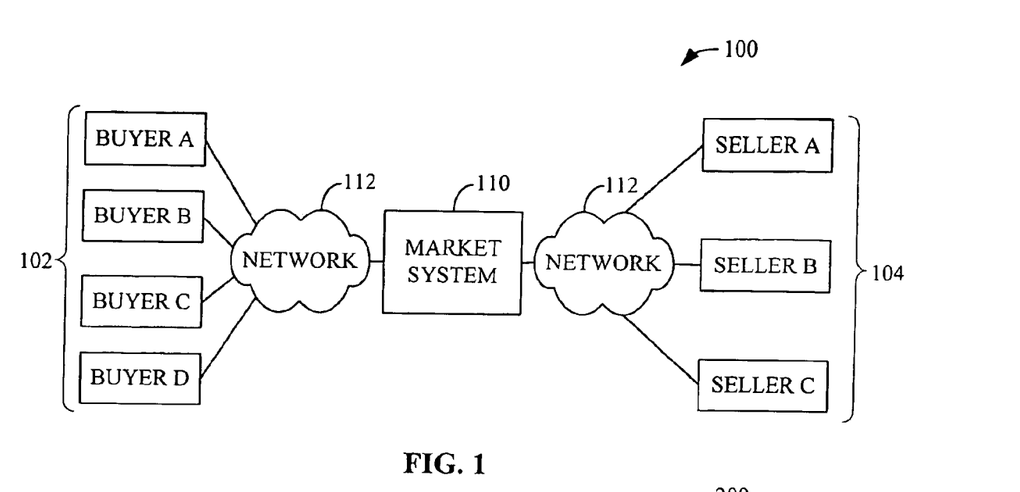
FIG. 1 is a schematic of an auction system utilizing an auctioning system and method.

FIG. 1 is a schematic of an auction system 100 generally comprising one or more buyers 102, one or more sellers 104, and a market system 110. The buyers 102 and the sellers 104 are in communication with the market system 110 via a network 112. The network 112 may be the Internet, an intranet, or an extranet, for example. An extranet may be a private network connection provided exclusively among two or more parties such as dealers, wholesalers, resellers, or suppliers.

The buyers 102 may submit multi-attribute bids to the market system 110 via the network 112. Similarly, the sellers 104 may submit multi-attribute bids to the market system 110 via the network 112. A multi-attribute bid is one in which the party submitting the bid may specify a plurality attributes of the good or service being exchanged. The plurality of attributes specified preferably includes a price as well as other attributes of the good or service. The attributes specified may include various quality characteristics of the good or service, the time and location of delivery, the quantity, and/or a nominal or baseline price. For example, in the case of a semiconductor chip, quality characteristics such as feature size, speed, power consumption, operating temperature, expected life, warranty, and/or other quality characteristics may be specified by the buyer and/or the seller.

The market system 110 collects the multi-attribute bids from the buyers 102 and sellers 104, processes the bids to match buyer bids to seller bids, and outputs the resulting matching bids to the buyers 102 and sellers 104 over the network 112. The functions and methodologies for the market system 110 will be described in more detail.

As shown in FIG. 1, there may be one or more buyers 102 and there may one or more sellers 104. Further, the number of buyers 102 need not equal the number of sellers 104. For purposes of discussion and clarity only, a buyer refers to a purchasing party and a single set of exclusive multi-attribute bids associated with that purchasing party. The set of exclusive multi-attribute bids refers to bids from which at most one bid may be matched to a seller bid. For each additional set of exclusive multi-attribute bids associated with the purchasing party, the purchasing party and that set of bids are defined as a separate buyer. Similarly, a seller refers to a selling party and a single set of exclusive multi-attribute bids associated with that selling party. For each additional set of exclusive multi-attribute bids associated with the selling party, the selling party and that set of bids are defined as a separate seller.

In the example shown in FIG. 1, Buyers A, B, C, and D 102 represent one, two, three, or four separate purchasing parties submitting four sets of exclusive multi-attribute buyer bids. Similarly, Sellers A, B, and C 104 represent one, two, or three separate selling parties submitting three sets of exclusive multi-attribute seller bids.

Figure 2:
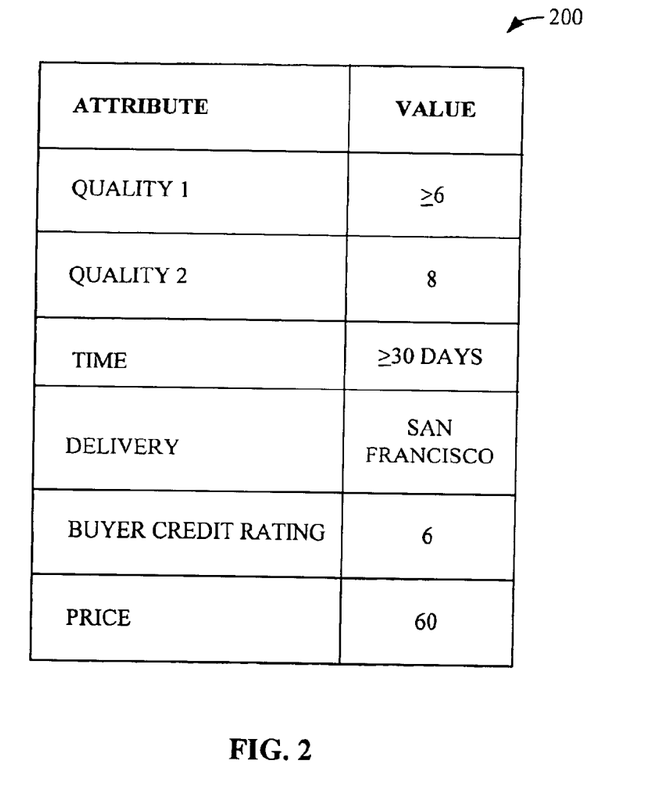
FIG. 2 is an example of a seller input screen in which a seller may submit or specify a set of exclusive multi-attribute bids.

FIG. 2 is an example of an input template or screen 200 in which a seller may submit or specify a set of exclusive multi-attribute bids or a set of multi-attribute values for generation of exclusive multi-attribute bids. The input screen 200 allows the seller to specify six predefined attributes of the good or service offered. The input screen 200 shown is merely illustrative of information which may be requested of a seller by the market system and the actual input screen may be in any other configuration or format.

The illustrative predefined attributes listed in the Attribute column of the input screen 200 are Quality 1, Quality 2, Time, Delivery, Buyer Credit Rating, and Price. The seller specifies one or more values for each attribute. An input screen similar to the input screen 200 shown in FIG. 2 but having the Buyer Credit Rating attribute replaced by a Seller Reliability attribute, for example, may represent an input screen for a buyer in which a buyer may submit a set of exclusive multi-attribute bids.

In the example shown in FIG. 2, the seller specifies a value of 6 or greater for Quality 1, a value of 8 for Quality 2, a time for delivery of 30 or more days, a delivery destination in San Francisco, a buyer credit rating of 6, and a price of 60. Each of Qualities 1 and 2 may represent any quality of the good or service that can be specified by a numerical quantity such as quantity, size or weight or by a non-numerical or descriptive term such as color or shape.

In the case of a positive quantity attribute, i.e., an attribute specified by a numerical quantity where a higher numerical quantity represents a better product or service, the market system may set by default or automatically assume that a value specified by the seller includes all lesser values and that a value specified by the buyer includes all greater values. For example, if Quality 2 is a positive quantity attribute, by specifying a value of 8 for Quality 2, the seller is in effect specifying 8 or less. Similarly, assuming a higher Buyer Credit Rating is a better credit rating and thus a positive quantity attribute, where the seller specifies a Buyer Credit Rating of 6, the seller is in effect specifying 6 or greater.

Conversely, in the case of a negative quantity attribute, i.e., an attribute specified by a numerical quantity where a lower numerical quantity represents a better product or service, the market system may set by default or automatically assume that a value specified by the seller includes all greater values and that a value specified by the buyer includes all lesser values.

A value specified for a given attribute may thus be deemed to be a minimum or maximum value of that attribute, depending upon whether the attribute is a positive or negative quantity attribute. However, the input screen may allow the buyer and seller to override any defaults or automatic expansions of the set of exclusive bids or the market system may not provide any automatic expansion of the set of exclusive bids. In the example shown, the price of the good or service is constant over the range of all possible attribute values. Thus, all bids of the multi-attribute set of bids submitted or input by the seller in input screen 200 have the same price of 60.

The market system may not automatically expand certain attributes, such as delivery destination or time for delivery. In particular, a higher value of certain attributes or qualities may not necessarily correspond to a better or worse product or service. For example, for inventory considerations and/or perishable items, an earlier or later delivery time may not uniformly increase or decrease the overall value or quality of the good or service for either a seller or a buyer.

Figure 3:
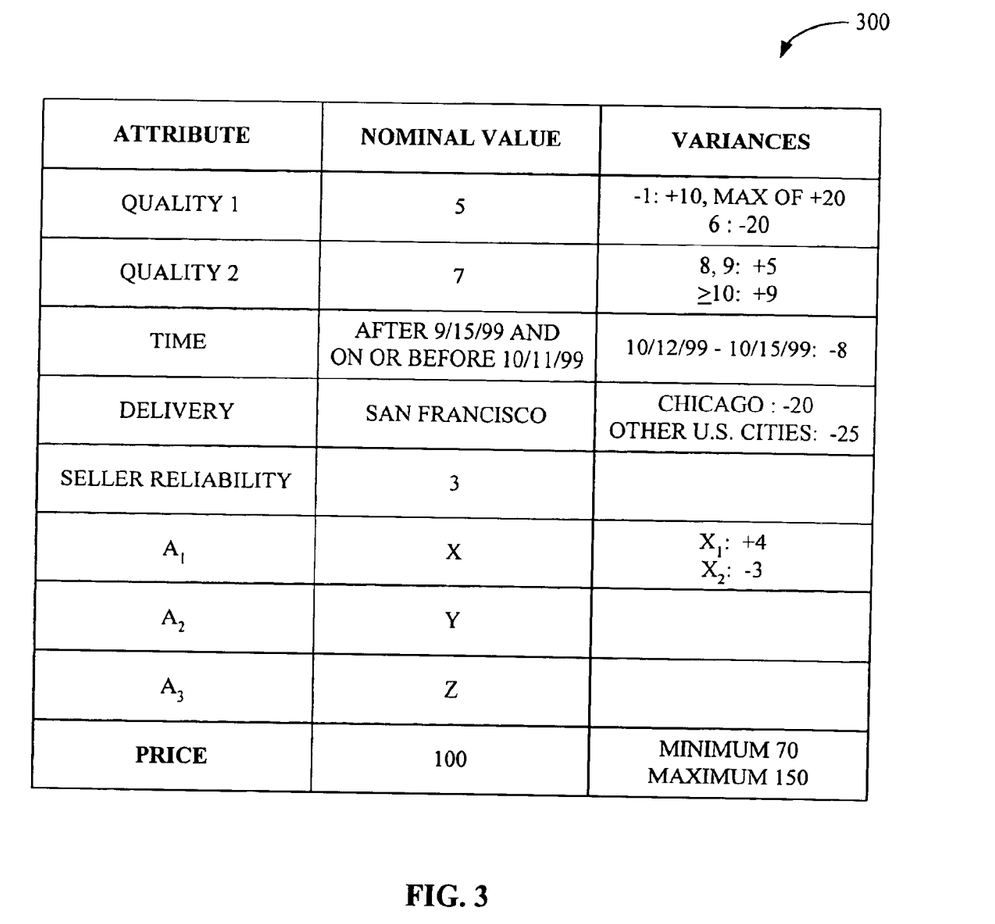
FIG. 3 shows an example of a buyer input screen in which a buyer may specify a set of exclusive multi-attribute bids, including variances to nominal attribute values in relation to nominal price.

The market system may also allow inputs of price variations as a result of variances to the values of attributes. FIG. 3 shows an example of an input template or screen 300 in which a buyer may specify a set of exclusive multi-attribute bids, including variances to nominal attribute values in relation to the nominal price. The illustrative input screen 300 allows variable pricing and is more expansive than the simpler input screen 200 shown in FIG. 2.

The input screen 300 allows the buyer to specify a nominal set of values for the predefined attributes, including a nominal price, in the Nominal Value column. In addition, input screen 300 allows the seller to specify variances to the nominal attribute in the Variances column, if desired. Preferably, the variances are specified relative to the nominal price. The nominal price as well as the variances specified relative to the nominal price are preferably specified in terms of a uniform measure. More preferably, the uniform measure is a monetary measurement, such as U.S. dollars or any other currency.

In the example shown, the input screen 300 allows the buyer to specify nine predefined attributes of the good or service offered. The illustrative predefined attributes listed in the Attribute column are Quality 1, Quality 2, Time, Delivery, Seller Reliability, Attributes $A_1$, $A_2$, $A_3$, and Nominal Price. The buyer specifies a nominal value for each attribute other than price in the Nominal Value column and a nominal price based on the nominal values of the non-price attributes. An input screen similar to the input screen 300 shown in FIG. 3 but having the Seller Reliability attribute replaced by a Buyer Credit Rating attribute, for example, may represent an input screen for a seller in which a seller may submit a set of exclusive multi-attribute bids.

The variances to the attributes may be expressed in a number of ways and need not vary linearly relative to price. In the example shown in FIG. 3, the buyer specifies a nominal value of 5 for Quality 1 and the variances to Quality 1 are such that each unit of decrease in the value of Quality 1 results in an increase of 10 in price relative the nominal price of 100, up to a maximum increase of 20 for any lower value of Quality 1. In this example, Quality 1 is a negative quantity attribute, such as features size for a semiconductor chip, i.e. a lower numerical quantity represents a better product or service. Thus, if the minimum value of Quality 1 is 1, then Quality 1 values of 1, 2, or 3 all result in an increase of 20 relative to the nominal price of 100. Further, by not specifying values of Quality 1 greater than 6, the market system preferably deems that all bids having values greater than 6 of Quality 1 would not satisfy or match the set of bids represented by the input screen 300.

In addition, substituting the nominal value of X for Attribute $A_1$ with $X_1$ increases the price by 4 relative to the nominal price of 100 and substituting with $X_2$ decreases the price by 3 relative to the nominal price of 100. Further, the buyer may also specify a price limit. For example, the buyer may specify a minimum price of 70 and/or a maximum price of 150. Thus, if a combination of values for the attributes results in a price outside of the price limit, i.e. greater than the maximum price, the market system preferably sets the price as 150. Similarly, if a combination of values for the attributes results in a price less than 150, the market system may deem the price to be 150. Alternatively, the market system may discard a combination of values that results in a price outside of the limit(s), e.g. exceeding the maximum price and/or falling below the minimum price. For example, the market system may by default and/or the buyer may specify that any bid having a price greater than 150 is set to 150 while any bid having a price less than 70 is discarded.

The above examples include a buyer credit rating attribute for the seller input screen and a seller reliability attribute for the buyer input screen. The buyer credit rating and the seller reliability attributes are preferably pre-assigned by the market system to each buyer and seller, respectively. For example, the buyer credit rating may be a rating assigned by reference to a third-party source such as DUN & BRADSTREET. Alternatively or additionally, each buyer or seller may favor or disfavor specific sellers or buyers by either including or excluding specific sellers or buyers from the set of bids or by increasing or decreasing the price relative to the nominal price depending upon the specific seller or buyer.

Figure 4:
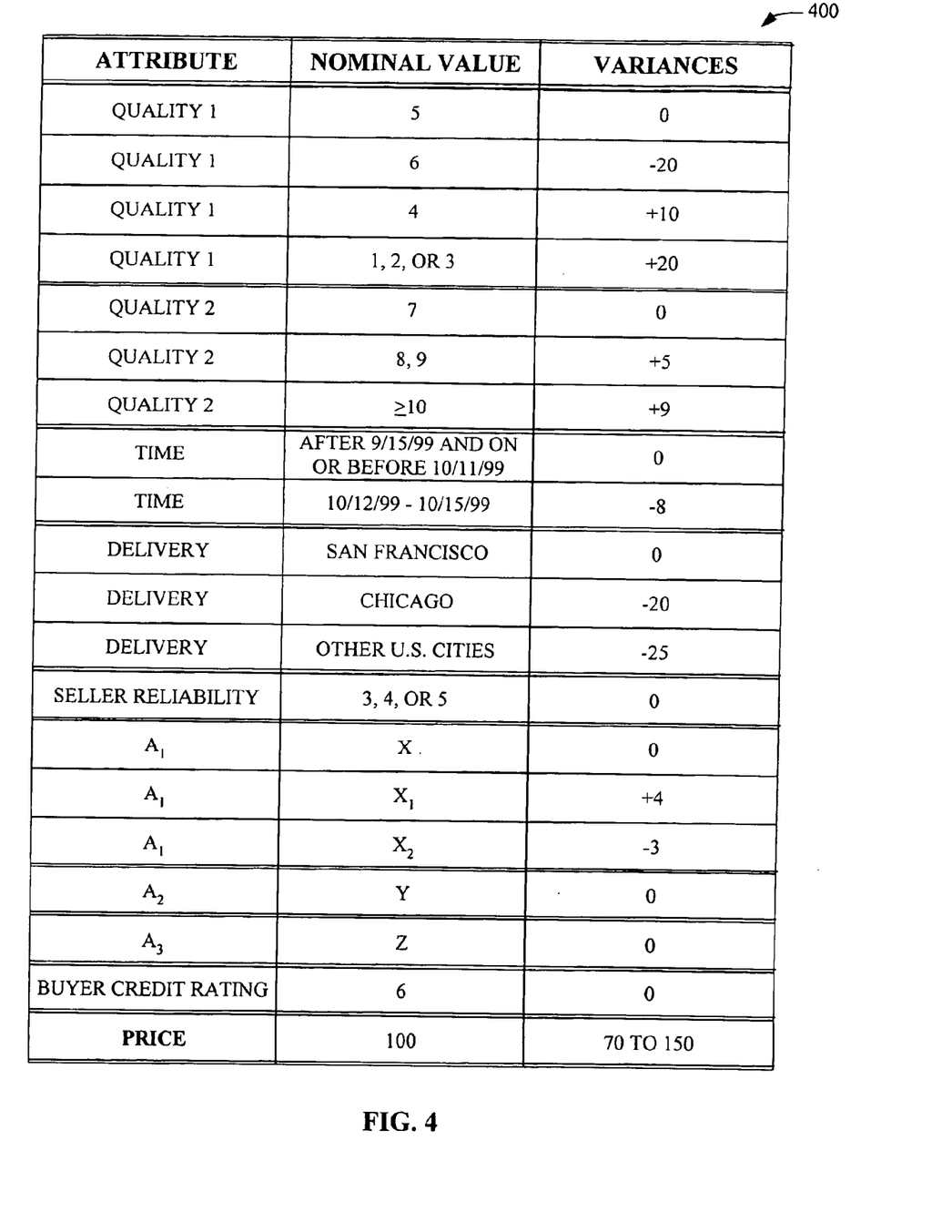
FIG. 4 is an example of a listing of all the attributes of the input screen of FIG. 3 and corresponding variance in price relative to nominal price.

FIG. 4 shows a listing 400 of all the attributes of the input screen 300 of FIG. 3 at their nominal values and variances relative to the nominal price of 100. Although the market system may or may not generate such a listing, the listing 400 represents expansions of the input screen generated by the market system and facilitates in understanding and appreciating the flexibility and versatility of the multi-attribute bid system.

The listing 400 of FIG. 4 expands the input screen 300 of FIG. 3. For example, the only delivery time periods listed are from after Sep. 15, 1999 to Oct. 11, 1999 and from Oct. 12, 1999 to Oct. 15, 1999. Thus, the only delivery time that would match or be compatible with the buyer bid is from after Sep. 15, 1999 to Oct. 11, 1999 at the nominal price or between Oct. 12, 1999 and Oct. 15, 1999 at 8 units below the nominal price. The listing 400 essentially lists all values of the attributes that are required for a seller bid to match the buyer bid. At most one of the possible bids may be subsequently selected as a matching bid to be cleared, as will be described in more detail below.

The market system may periodically or continually clear bids. In a periodic clearing mechanism, all buyer and seller bids submitted during a certain time period are collected, processed and cleared. In a continual clearing mechanism, each time a new bid from a seller or a buyer is submitted, the market system processes and attempts to clear the new bid. Each of these clearing mechanisms is described below with reference to FIGS. 5A and 5B.

Figure 5A:
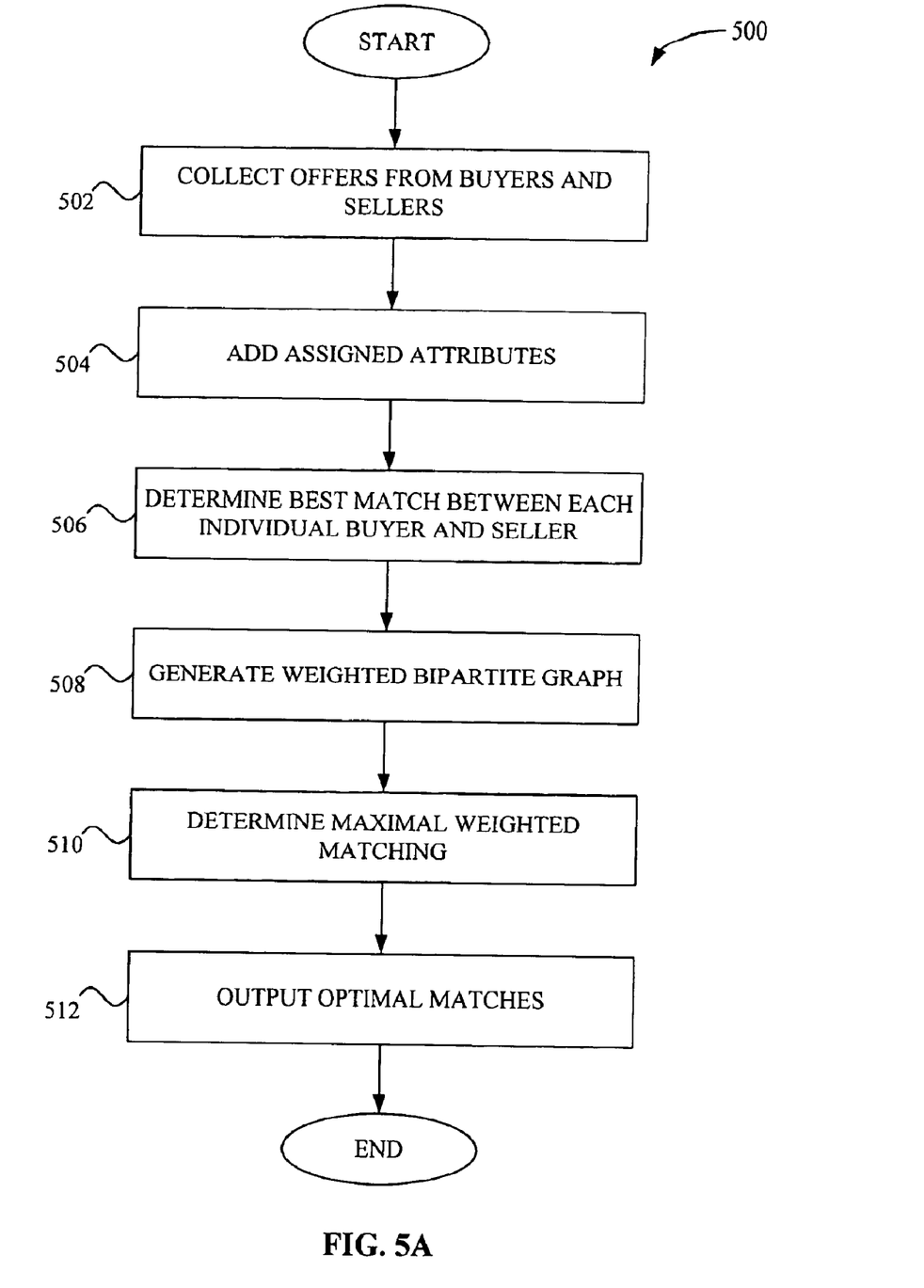
FIG. 5A is a flow chart illustrating a process for the automated market system to collect and periodically clear bids from buyers and sellers.

FIG. 5A is a flow chart illustrating a process 500 for the automated market system to collect and periodically clear bids from buyers and sellers. The market system executes process 500 each time a periodic clearing occurs, rather than each time a new bid is submitted.

All buyer and seller offers or bids submitted during a certain time period are collected in step 502. Any pre-assigned attributes are added to the offers in step 504. For example, buyer credit ratings may be assigned to each buyer and/or seller reliability ratings may be assigned to each seller such that the buyer credit and seller reliability rating attributes must match those specified by the seller and buyer, respectively.

A best match or a best matching pair of offers between each buyer and each seller is determined in step 506. In the example shown in FIG. 1, a best match or the best matching pair of offers is determined between each of Buyers A, B, C, and D and each of Sellers A, B, and C such that a total of 12 best matches are determined between the buyers and sellers.

The best matching pair or bids between a buyer and a seller is defined as the pair of bids having the greatest surplus among all matching or compatible bids between the buyer and seller. Matching or compatible bids have attribute values that are better than what the buyer specified or not as good as what the seller specified, if the market system has such automatic attribute value expansions feature for a given attribute. For example, a pair of buyer and seller bids having matching or compatible attribute values must necessarily have a seller price that is less than or equal to the buyer price. The buyer price is in essence what the buyer has specified as the maximum price the buyer is willing to pay for a good or service having the associated set of attribute values. Similarly, the seller price is in essence what the seller has specified as the minimum price the seller is willing to accept for a good or service having the associated set of attribute values.

After the best match between each buyer and each seller is determined in step 506, a weighted bipartite graph is generated in step 508 using the results of step 506. The weighted bipartite graph is in turn used to determine a maximal weighted matching in step 510. Finally, the optimal matches are output in step 512. Thus, in a periodic clearing mechanism, the market system outputs one set of results in step 512 for each periodic clearing.

Figure 5B:
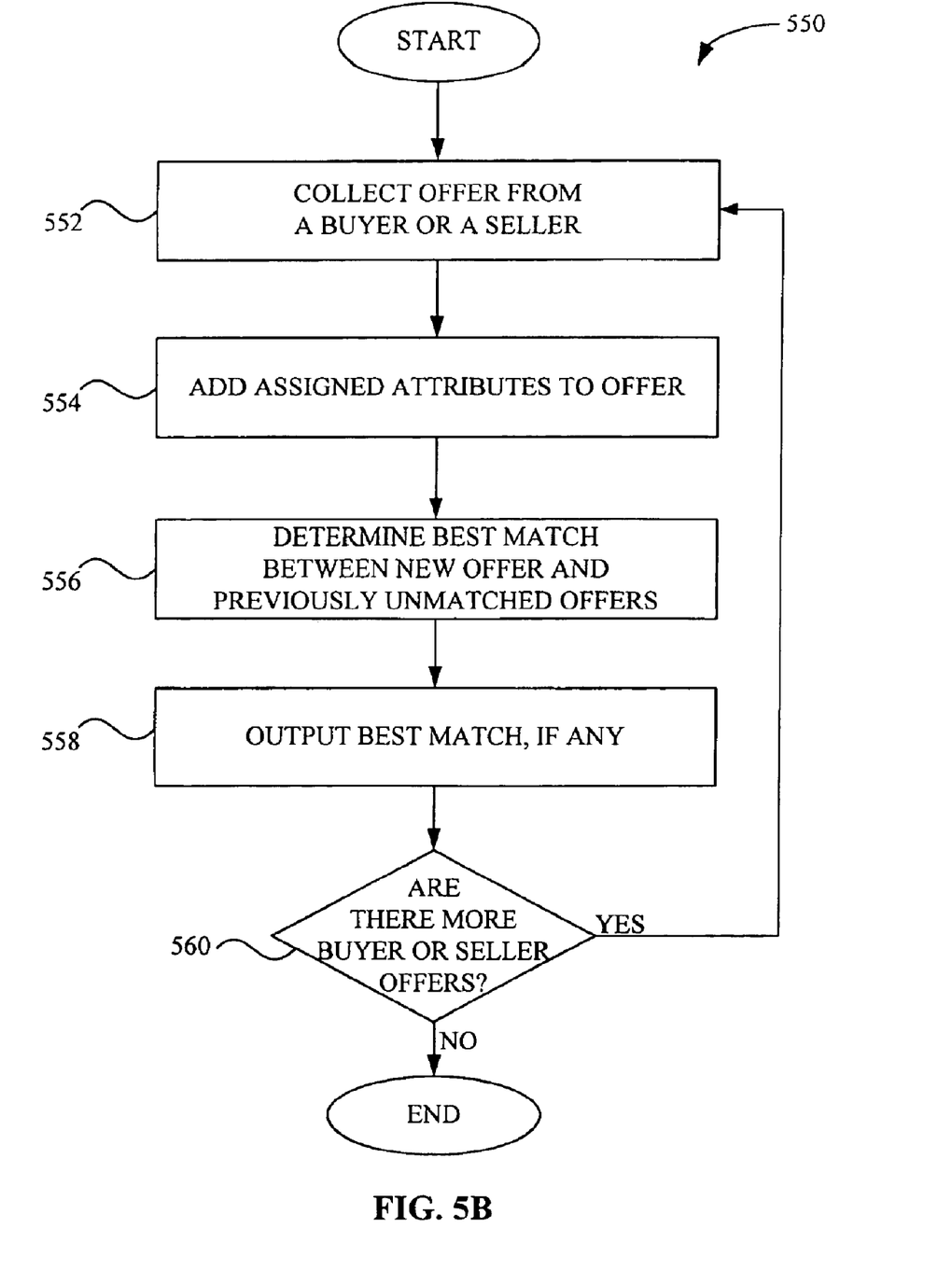
FIG. 5B is a flow chart illustrating a process for the automated market system to collect and continually clear bids from buyers and sellers.

FIG. 5B is a flow chart illustrating a process 550 for the automated market system to collect and continually clear bids from buyers and sellers. In a continual clearing mechanism, each time a new bid from a seller or a buyer is submitted, the market system processes and attempts to clear the new bid. A new offer is collected from a seller or a buyer in step 552. Any pre-assigned attributes are added to the new offer in step 554. For example, buyer credit ratings may be assigned to each buyer and/or seller reliability ratings may be assigned to each seller such that the buyer credit and seller reliability rating attributes must match those specified by the seller and buyer, respectively.

A best match or a best matching pair of bids between the new offer and previously unmatched offers is determined in step 556. The determination of the best match in step 556 may be similar to the determination of best matches in step 506 of the periodic clearing process 500. However, if the new offer is from a buyer, the new buyer offer is preferably only matched against previously unmatched seller offers although previously unmatched buyer offers may exist. If the new offer is compatible with at least one of the previously unmatched offers, then the best match between the new offer and previously unmatched offers is output in step 558. Step 560 determines if there are any more buyer or seller offers. If there is, process 550 returns to step 552 to collect a new offer. If not, process 550 is complete. Alternatively or in conjunction therewith, the process 550 may end when a certain time limit is reached or when a certain threshold number of matches are made, for example.

Figure 6:
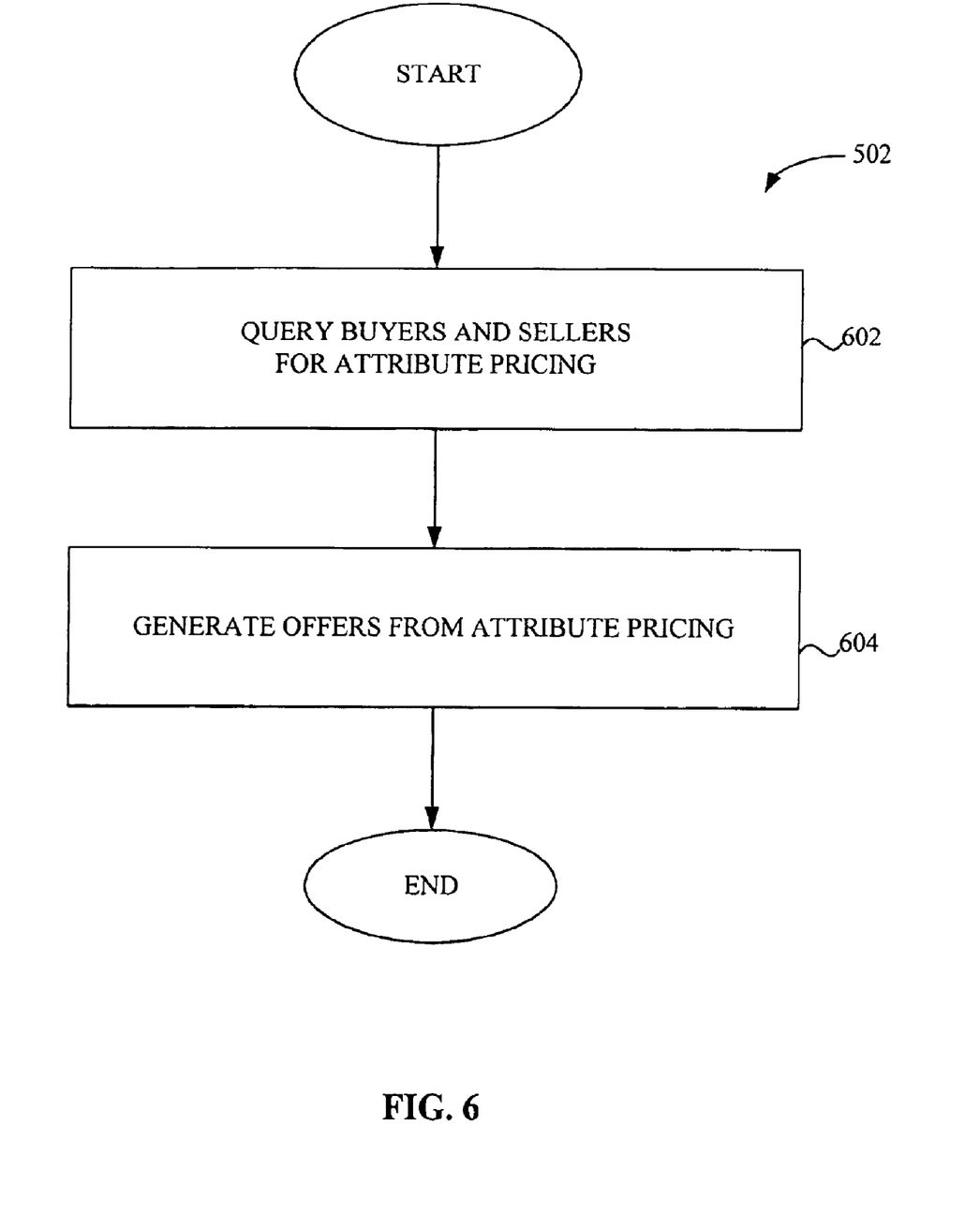
FIG. 6 is a flow chart illustrating the step of collecting offers or bids from buyers and sellers.

FIG. 6 is a flow chart illustrating the step 502 of collecting offers or bids from buyers and sellers. In step 602, the buyers and sellers are queried for attribute pricing. The query may be in the form of input screens such as those shown in FIGS. 2 and 3. Preferably, a set of nominal values for a predetermined set of attributes is the minimal input required for each buyer and each seller. Each buyer and seller may optionally also specify variances to the nominal values of the attributes. The variances to the nominal values of the attributes may optionally in turn be specified relative to the nominal price.

In step 604, a set of offers or bids are generated from the attribute pricing input screens input by each seller and each buyer. In one embodiment, the set of bids may be generated using a listing such as the listing 400 shown in FIG. 4 and by generating combinations of the different values of the different attributes that would result in a price within an allowable price range, for example. As noted above, where a buyer specifies a maximum price, the combination of attribute values resulting in a price higher than the maximum price may be set to the maximum price. In addition, where a seller specifies a minimum price, the combination of attribute values resulting in a price lower than the minimum price may be set to the minimum price. In other cases where combinations of attribute values result in prices outside the specified price ranges, those bids or offers are preferably discarded.

Figure 7:
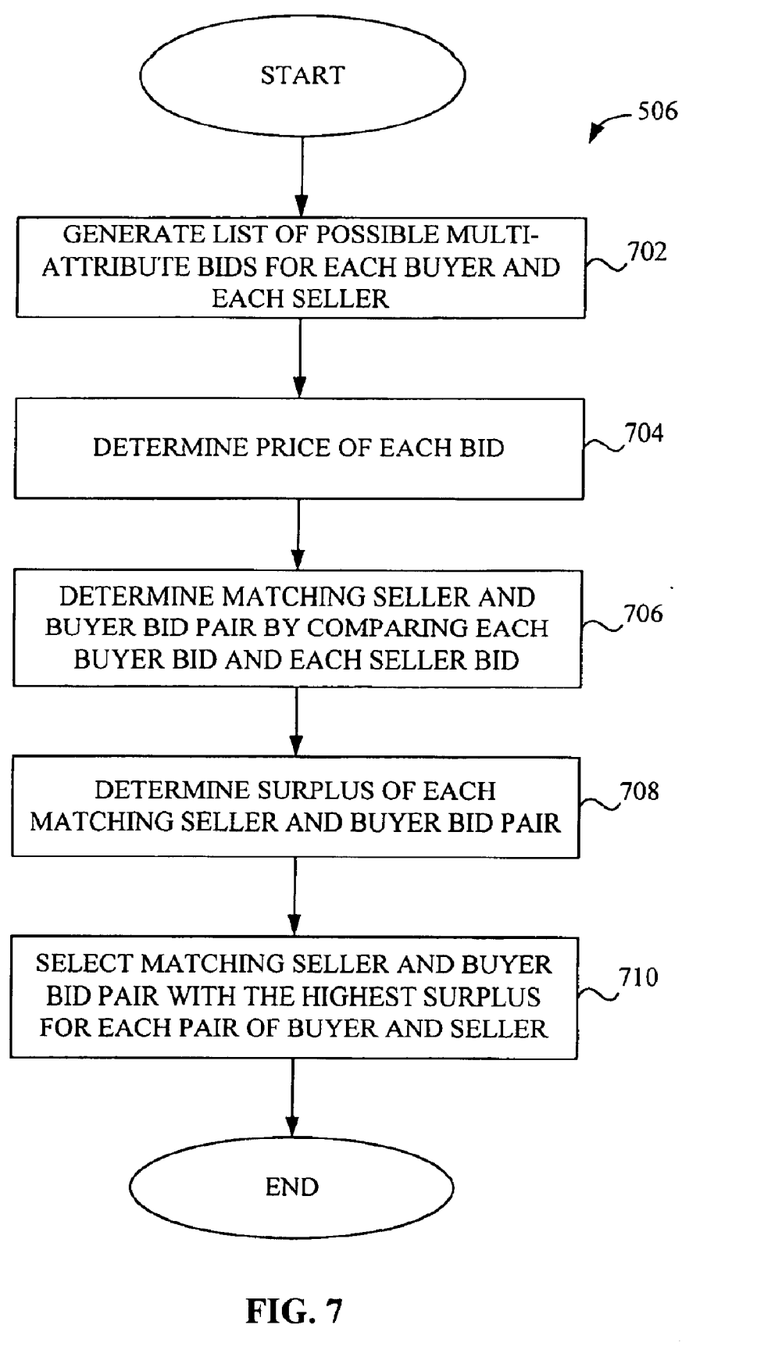
FIG. 7 is a flow chart illustrating the step of determining the best match between each buyer and each seller.

FIG. 7 is a flow chart illustrating the step 506 of determining the best match between each buyer and each seller. First, lists of possible multi-attribute bids for each buyer and each seller are generated in step 702. The price of each multi-attribute bid is determined in step 704. Although steps 702 and 704 are shown as separate steps, the price may be determined simultaneously with the generating of the bids for each buyer and each seller. The price may be determined as an absolute value or as a value relative to the nominal price.

Next, every possible bid of each buyer is compared with every possible bid of each seller to determine matching or compatible bids in step 706. For example, if a set of N multi-attribute exclusive bids was generated for a buyer and a set of M multi-attribute exclusive bids was generated for a seller, then the matching or compatible bids between the buyer and the seller are selected from N*M buyer-seller bid combinations.

Matching or compatible bids refer to a buyer bid and a seller bid whose attribute values match, i.e. within the required range. For example, a buyer bid having a price of 100 is not compatible and does not match a seller bid having a price of 110. On the other hand, a buyer bid having a price of 110 is price compatible and does match the price attribute of a seller bid having a price of 110. If all other values of the attributes similarly match or are compatible, then the bids between the buyer and seller match and are compatible.

As noted above, in the case of a positive quantity attribute, the market system may automatically assume that a value specified by the seller includes all lesser values and that a value specified by the buyer includes all greater values. Conversely, in the case of a negative quantity attribute, the market system may automatically assume that a value specified by the seller includes all greater values and that a value specified by the buyer includes all lesser values.

For each pair of matching buyer-seller bids, a surplus is determined in step 708. The surplus is the difference between the buyer price and the seller price for a given matching buyer-seller pair of bids, the seller price being less than or equal to the buyer price. For each buyer-seller pair, a matching pair of bids having a highest surplus among all matching bids of the buyer-seller pair is selected in step 710.

Where there are two or more matching pairs of bids having the highest surplus among all matching bids of the buyer-seller pair, the market system may select one of the matching bid pairs based upon certain rules. In one embodiment, the selection may be automated by providing predetermined or preset rules. For example, the market system may first select one or more matching bid pairs having a lowest or a highest price and, if more than one matching bid pairs result, then selecting the matching bid pair having an earlier delivery date. Alternatively, an administrator or operator of the market system may manually select one of the matching bid pairs. However, where the process is not automated, the administrator or operator preferably intervenes only after determining that the buyer-seller match is included in the maximal weighted matching determined in step 510 (as shown in FIG. 5). As will be described below, it is the value of the highest surplus that is utilized in the determination of the maximal weighted matching such that, the specific combination of attributes associated with the surplus is not relevant at this point.

Figure 8:
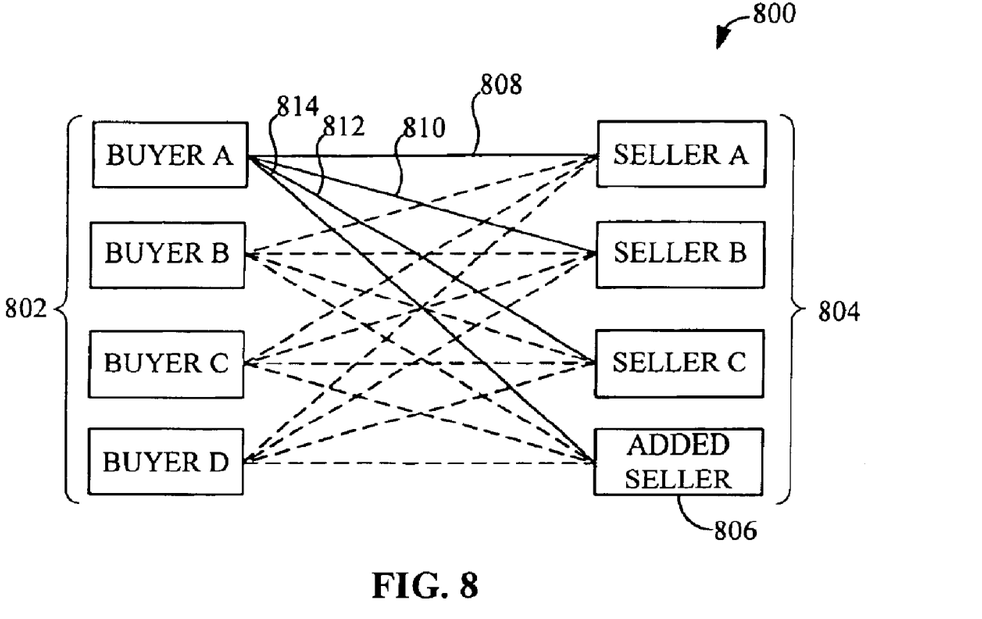
FIG. 8 is a schematic of an example of a weighted bipartite graph.

FIG. 8 is a schematic of an example of a weighted bipartite graph 800. The buyers and the sellers are assigned as buyer nodes 802 and seller nodes 804 of the weighted bipartite graph 800. The weighted bipartite graph 800 also includes an edge or link-between each buyer node and each seller node. An edge between a buyer and a seller represents the highest surplus or the best matching pair of bids between the corresponding buyer and seller. Further, the edges have weights or values equal to the surplus of the corresponding best matching pair of buyer and seller bids determined in step 710 (as shown in FIG. 7).

Where there are no matching bids between a buyer and a seller, an edge having a weight of 0 may nonetheless be added. However, if there are no matching bids between a buyer and any of the sellers (or between a seller and any of the buyers), the corresponding buyer (or seller) node may be removed from the weighted bipartite graph 800. If after the removal of all unmatched buyers and/or sellers there are an unequal number of buyers and sellers, a dummy or added buyer or seller node is preferably added to the set of nodes such that there are an equal number of buyer and seller nodes, Thus, given N number of resulting buyer nodes and N number of resulting seller nodes, the weighted bipartite graph 800 preferably includes a total of $N^2$ edges.

In the example shown in FIG. 8, there are more buyer nodes than seller nodes such that a dummy or added seller node 806 is added to the set of seller nodes 804, resulting in an equal number of buyer and seller nodes. Edges 808, 810, 812 of the bipartite graph 800 have as weights the highest surplus of the matching bids between Buyer A and Sellers A, B, and C, respectively. Edge 814 between Buyer A and Added Seller 806 is defined to have a weight of 0 such that it does not contribute in the determination of the maximal weighted matching. The other edges between each buyer and each seller are shown in dashed lines merely for purposes of clarity.

Figure 9:
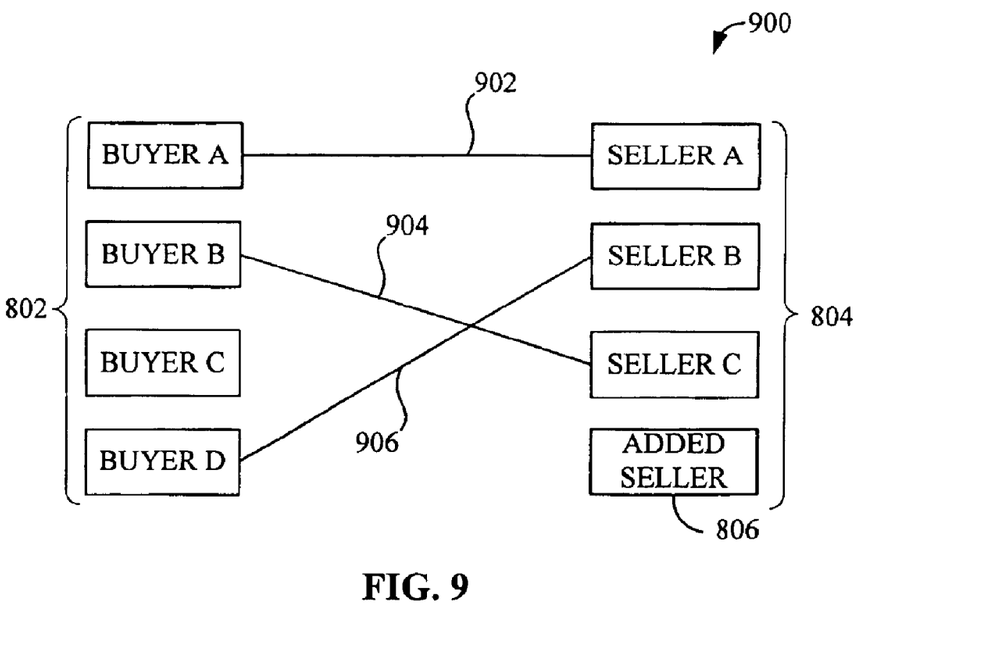
FIG. 9 is a schematic of an example of a maximal weighted matching.

FIG. 9 is a schematic of an example of a maximal weighted matching obtained using the weighted bipartite graph 800 of FIG. 8. The maximal weighted matching is an overall matching of the buyers and sellers. There may be numerous possible matching combinations of the weighted bipartite graph. Each matching combination comprises a subset of the edges where each buyer node and each seller is at a node of at most one of the edges of the subset. A matching combination having a largest sum of the weights among all the possible matching combinations is the maximal weighted matching. Thus, the highest overall surplus is a sum of the weights of the edges of the maximal weighted matching.

As shown, the maximal weighted matching 900 includes edges 902, 904, and 906 such that the combination of the best matches between Buyer A and Seller A, Buyer B and Seller C, and Buyer D and Seller B results in a highest overall surplus. The Added Seller is not part of the maximal weighted matching 900 because all edges to the Added Seller have a weight of 0 and thus the Added Seller does not contribute to the overall surplus.

Determination of the maximal weighted matching of a weighted bipartite graph, also known as the assignment problem, is well known to those of ordinary skill in the art and described, in for example, Ahuja, Ravindra K., Thomas L. Magnanti, and James B. Orlin, "Network Flows: Theory, Algorithms, and Applications," 1993, (see, in particular Section 12.4). The Ahuja reference discloses the bipartite weighted matching problem; given a weighted bipartite network $G=(N_1 \cup N_2, A)$ with $|N_1|=|N_2|$ and arc weights $c_{ij}$, finds a perfect matching of minimum weight. Here, the network G is directed or undirected. If the network is directed, for each arc $(i, j) \in A$, $i \in N_1$ and $j \in N_2$. If the network is undirected, the network is made directed by designating all arcs as pointing from the nodes in $N_1$ to those in $N_2$. Therefore, the following examples assume that G is a directed graph.

The assignment problem is a special case of the minimum cost flow problem and can be stated as the following linear program.

Minimize $$\sum_{(j:(i,j) \in A)} c_{ij} x_{ij}$$

subject to $$\sum_{(j:(i,j)\in A)} x_{ij} = 1$$

for all $i \in N_1$, $$\sum_{(j:(i,j)\in A)} x_{ij} = 1$$

for all $i \in N_2$, $x_{ij} \geq 0$ for all $(i, j) \in A$.

Since the weighted bipartite matching problem may be formulated as this special type of flow problem, it is not too surprising to learn that most algorithms for the assignment problem can be viewed as adaptations of algorithms for the minimum cost flow problem. However, the special structure of the assignment problem often permits simplification of these algorithms and to obtain improved bounds on their running times.

One popular algorithm for the assignment problem is a specialization of the network simplex algorithm and the successive shortest path algorithm and its many variants, that are well known to those of ordinary skill in the art. Examples of algorithms to solve a maximal weighted matching or assignment problem include specialization of a network simplex algorithm, successive shortest path algorithm, Hungarian algorithm, relaxation algorithm, and cost scaling algorithm for a minimum cost flow problem, as will be further described below. Many of these algorithms can be viewed as various adaptations of algorithms for a minimum cost flow problem. Any such or other suitable algorithms may be utilized to determine the maximal weighted matching of multi-attribute bids. The following briefly describe some of these successive shortest path-based algorithms and the cost scaling algorithm.

The successive shortest path algorithm, which is well known to those of ordinary skill in the art, obtains shortest path distances from a supply node to all other nodes in a residual network, uses these distances to update node potentials and then augments flow from that supply node to a demand node. The successive shortest path algorithm, when applied to the assignment problem, would augment one unit flow in every iteration, which would amount to assigning one additional node in $N_1$. Consequently, if $S(n, m, C)$ denotes the time needed to solve a shortest path problem with nonnegative arc lengths and $n_1 = |N_1|$, the algorithm would terminate within $n_1$ iterations and would require $O(n_1 S(n, m, C))$ time.

The Hungarian algorithm, which is well known to those of ordinary skill in the art, is a direct implementation of the primal-dual algorithm for the minimum cost flow problem. The primal-dual algorithm first transforms the minimum cost flow problem into a problem with a single supply node s* and a single demand node t*. At every iteration, the primal-dual algorithm computes shortest path distances from s* to all other nodes, updates node potentials, and then solves a maximum flow problem that sends the maximum possible flow from node s* to node t* over arcs with zero reduced costs. When applied to the assignment problem, this algorithm terminates within $n_1$ iterations since each iteration sends at least one unit of flow, and hence assigns at least one additional node in $N_1$. The time required to solve shortest path problems in all these iterations is $O(n_1 S(n, m, C))$. Next consider the total time required to establish maximum flows. The labeling algorithm for solving the maximum flow problem would require a total of $O(nm)$ time because it would perform n augmentations and each augmentation requires $O(m)$ time. The dominant portion of these computations is the time required to solve shortest path problems. Consequently, the overall running time of the algorithm is $O(n_1 S(n, m, C))$.

The relaxation algorithm, which is closely related to the successive shortest path algorithm, is also well known to those of ordinary skill in the art and is another popular approach for solving the assignment problem. This algorithm relaxes the constraints $$\sum_{\{j:(i,j)\in A\}} x_{ij} = 1$$

for all $i \in N_2$, thus allowing any node in $N_2$ to be assigned to more than one node in $N_1$. To solve the relaxed problem: Assign each node $i \in N_1$ to any node $j \in N_2$ with the minimum cost $c_{ij}$ among all arcs in A(i). As a result, some nodes in $N_2$ might be unassigned while some other nodes are over assigned (i.e., assigned to more than one node in $N_1$). The algorithm then gradually converts this solution to a feasible assignment while always maintaining the reduced cost optimality condition. At each iteration the algorithm selects an over-assigned node k in $N_2$, obtains shortest path distances from node k to all other nodes in a residual network with reduced costs as arc lengths, updates node potentials, and augments a unit flow from node k to an unassigned node in $N_2$ along the shortest path. Since each iteration assigns one more node in $N_2$ and never converts any assigned node into an unassigned node, within $n_1$ such iterations, the algorithm obtains a feasible assignment. The relaxation algorithm maintains optimality conditions throughout. Therefore, the shortest path problems have nonnegative arc lengths, and the overall running time of the algorithm is $O(n_1 S(n, m, C))$.

The cost scaling algorithm, which is well known to those of ordinary skill in the art, is an adaptation of the cost scaling algorithm for the minimum cost flow problem. The cost scaling algorithm performs $O(nC)$ scaling phases and the generic implementation requires $O(n^2 m)$ time for each scaling phase. The bottleneck operation in each scaling phase is performing nonsaturating pushes which require $O(n^2 m)$ time; all other operations, such as finding admissible arcs and performing saturating pushes, require $O(nm)$ time. When applying the cost scaling algorithm to the assignment problem, each push is a saturating push since each arc capacity is one. Consequently, the cost scaling algorithm solves the assignment problem in $O(nm \log(nC))$ time.

A modified version of the cost scaling algorithm has an improved running time of $O(\sqrt{n}m \log(nC))$, which is the best available time bound for assignment problems satisfying the similarity assumption. This improvement rests on decomposing the computations in each scaling phase into two subphases. In the first subphase, apply the usual cost scaling algorithm is applied with the difference that whenever a node is relabeled more than $2\sqrt{n}$ times, this node is set aside and not examined further. When all (remaining) active nodes have been set aside, the second subphase is initiated. It is possible to show that the first subphase requires $O(\sqrt{n_1}m)$ time, and when it ends, the network will contain at most $O(\sqrt{n_1})$ active nodes. The second subphase makes these active nodes inactive by identifying "appropriate shortest paths" from nodes with excesses to nodes with deficits and augmenting unit flow along these paths. The algorithm uses Dial's algorithm to identify each such path in $O(m)$ time. Consequently, the second subphase also runs in $O(\sqrt{n_1}m \log(nC))$.

Where two or more of the possible matching combinations of the weighted bipartite graph has a largest sum of the weights, the market system may select one of the matching combinations based upon certain rules. In one embodiment, the selection may be automated by providing predetermined or preset rules. For example, the market system may determine the sum of the seller reliabilities and/or buyer credit ratings for each of the maximal weight matching combinations and select the one with the highest sum of the seller reliabilities and/or the highest buyer credit ratings. As is evident, any other suitable rule may be implemented and applied to select one of a plurality of maximal weight matching combinations. Alternatively, an administrator or operator of the market system may manually select one of the maximal weight matching combinations.

Figure 10:
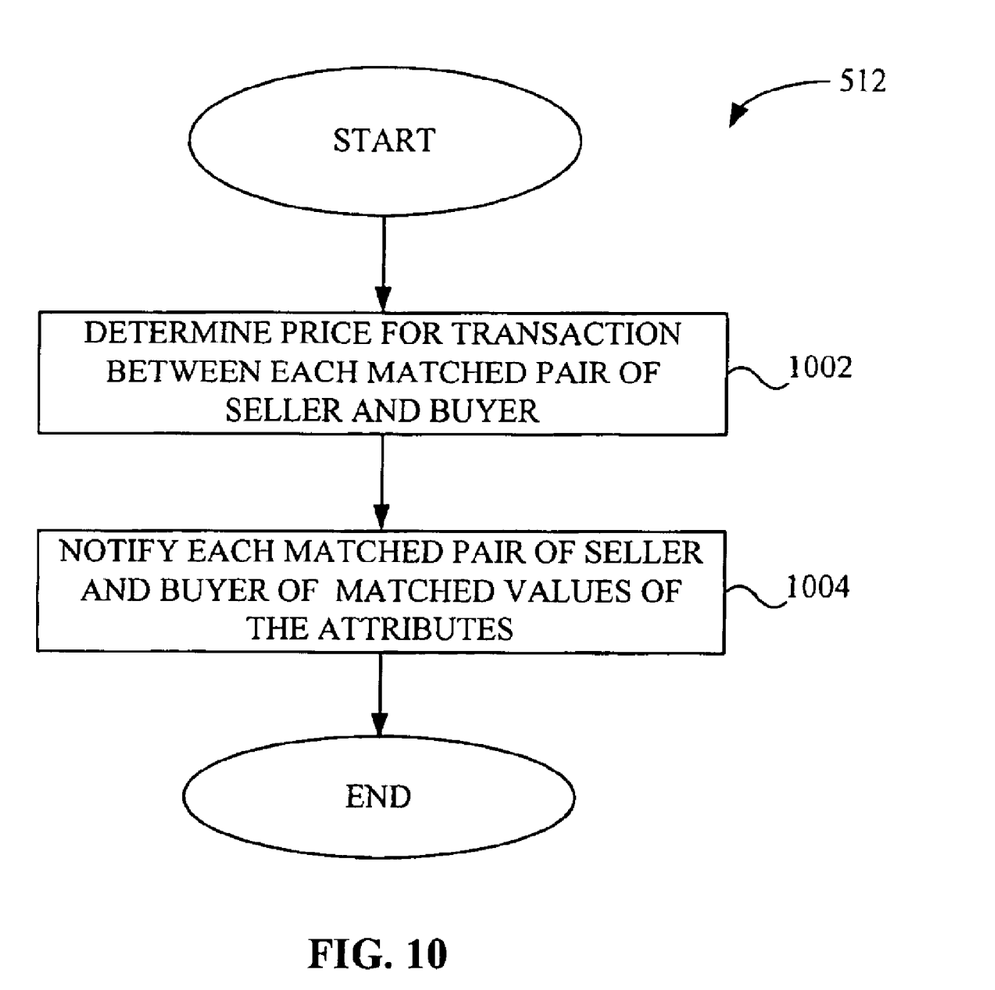
FIG. 10 is a flow chart illustrating the step of outputting the optimal buyer-seller matches.

FIG. 10 is a flow chart illustrating the step 512 of outputting the optimal buyer-seller matches. After determining the maximal weighted matching, the market system preferably determines the price of each transaction between each matched pair of seller and buyer in step 1002. The surplus between the matched pair of seller and buyer may be split among the buyer, the seller, the market system, and/or any other parties.

In one embodiment, all or a portion of the information relating to the bids submitted by the sellers, for example, may be available to the buyers, or vice versa. In such cases, the surplus may be distributed to the side that has disclosed the information, less a portion for transaction fee, for example. In other embodiments, all, some or none of the information relating to each side of the bidding process may be disclosed, for example, to those on the same side of the bidding process, to those on the opposing side of the bidding process, or both.

In step 1004, each matched pair of seller and buyer is notified of the match as well as the matched values of the attributes, including the price determined in step 1002. Various information regarding the matches may be selectively disseminated by the market system to other matched sellers and buyers, to unmatched sellers and buyers, for example, and/or to others outside of the group of participating buyers and sellers. The market system repeats the above-described process when it performs another clearing.

The above described method and process are preferably implemented in a computer program product having computer codes that perform the various steps of the method and process. The computer codes are preferably stored in a computer readable medium, such as CD-ROM, zip disk, floppy disk, tape, flash memory, system memory, hard drive, and data signal embodied in a carrier wave, such as over a network.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A computerized method of matching at least one multi-attribute bid from one or more buyers and at least one multi-attribute bid from one or more sellers, the computerized method comprising:

electronically selecting a pair of bids between each buyer and each seller from a plurality of compatible bid pair combinations, the selected pair of bids having a highest surplus between each buyer bid and seller bid, each buyer and seller bid being based on at least one variance to a nominal attribute value of at least one attribute and a corresponding variance relative to the nominal bid value, wherein each buyer and seller bid is a price, the price being expressed in terms of a uniform measurement unit;

electronically generating a weighted bipartite graph comprising buyer nodes and seller nodes and an edge between each buyer node and each seller node, each edge having the highest surplus of the pair of bids between the buyer and seller as a weight; and electronically determining maximal weighted matching bids from the highest surplus pairs of bids using the weighted bipartite graph.

2. The computerized method of claim 1, wherein each buyer is associated with at most one maximal weighted matching bid and each seller is associated with at most one maximal weighted matching bid.

3. The computerized method of claim 1, wherein said selecting the highest surplus pair of bids between each buyer and each seller includes determining a value associated with each bid of a buyer and each bid of a seller.

4. The computerized method of claim 3, wherein said highest surplus of a pair of bids between each buyer and each seller is a highest difference between the value of each bid of the buyer and the value of each bid of the seller.

5. The computerized method of claim 1, further comprising collecting at least one multi-attribute bid from one or more buyers and at least one multi-attribute bid from one or more sellers, each bid having a plurality of attributes specified by a buyer or seller.

6. The computerized method of claim 5, wherein each bid has at least one predetermined attribute.

7. The computerized method of claim 5, wherein said plurality of attributes are specified relative to a uniform measurement unit.

8. The computerized method of claim 7, wherein said uniform measurement unit is a monetary unit.

9. The computerized method of claim 1, wherein said selecting the highest surplus pair of bids between each buyer and each seller includes determining a difference between the price of each buyer bid and the price of each seller bid.

10. The computerized method of claim 1, wherein each bid has a plurality of attributes, at least a portion of the attributes being specified by a buyer or seller and wherein said selecting the highest surplus pair of bids between each buyer and each seller further includes:

electronically generating bids for each buyer from the plurality of attributes;

electronically generating bids for each seller from the plurality of attributes;

electronically comparing attributes of each bid of each buyer with attributes of each bid of each seller.

11. The computerized method of claim 10, wherein said selecting the highest surplus pair of bids between each buyer and each seller further includes generating a list of matching bids between each buyer and each seller, each matching bid having compatible attributes.

12. The computerized method of claim 11, wherein said highest surplus pair of bids between each buyer and each seller is selected from said list of matching bids.

13. The computerized method of claim 10, wherein said compatible attributes includes a buyer price lower than or equal to a seller price.

14. The computerized method of claim 11, wherein said generating the list includes discarding pairs of bids between each buyer and each seller where a buyer price is lower than a seller price.

15. A computer-readable medium having instructions to cause a computer to perform a computerized method of matching at least one multi-attribute bid from one or more buyers and at least one multi-attribute bid from one or more sellers, the computerized method comprising:

- Electronically selecting a pair of bids between each buyer and each seller from a plurality of compatible bid pair combinations, the selected pair of bids having a highest surplus between each buyer bid and seller bid, each buyer and seller bid being based on at least one variance to a nominal attribute value of at least one attribute and a corresponding variance relative to the nominal bid value, wherein each buyer and seller bid is a price, the price being expressed in terms of a uniform measurement unit;
- Electronically generating a weighted bipartite graph comprising buyer nodes and seller nodes and an edge between each buyer node and each seller node, each edge having the highest surplus of the pair of bids between the buyer and seller as a weight; and
- Electronically determining maximal weighted matching bids from the highest surplus pairs of bids using the weighted bipartite graph.

16. The computer-readable medium of claim 15, wherein each buyer is associated with at most one maximal weighted matching bid and each seller is associated with at most one maximal weighted matching bid.

17. The computer-readable medium of claim 15, wherein said selecting the highest surplus pair of bids between each buyer and each seller includes determining a value associated with each bid of a buyer and each bid of a seller.

18. The computer-readable medium of claim 17, wherein said highest surplus of a pair of bids between each buyer and each seller is a highest difference between the value of each bid of the buyer and the value of each bid of the seller.

19. The computer-readable medium of claim 15, further comprising collecting at least one multi-attribute bid from one or more buyers and at least one multi-attribute bid from one or more sellers, each bid having a plurality of attributes specified by a buyer or seller.

20. The computerized method of claim 19, wherein each bid has at least one predetermined attribute.

21. The computer-readable medium of claim 19, wherein said plurality of attributes are specified relative to a uniform measurement unit.

22. The computer-readable medium of claim 21, wherein said uniform measurement unit is a monetary unit.

23. The computer-readable medium of claim 15, wherein said selecting the highest surplus pair of bids between each buyer and each seller includes determining a difference between the price of each buyer bid and the price of each seller bid.

24. The computer-readable medium of claim 15, wherein each bid has a plurality of attributes, at least a portion of the attributes being specified by a buyer or seller and wherein said selecting the highest surplus pair of bids between each buyer and each seller further includes:
- generating bids for each buyer from the plurality of attributes;
- generating bids for each seller from the plurality of attributes;
- comparing attributes of each bid of each buyer with attributes of each bid of each seller.

25. The computer-readable medium of claim 24, wherein said selecting the highest surplus pair of bids between each buyer and each seller further includes generating a list of matching bids between each buyer and each seller, each matching bid having compatible attributes.

26. The computer-readable medium of claim 25, wherein said highest surplus pair of bids between each buyer and each seller is selected from said list of matching bids.

27. The computer-readable medium of claim 24, wherein said compatible attributes includes a buyer price lower than or equal to a seller price.

28. The computer-readable medium of claim 25, wherein said generating the list includes discarding pairs of bids between each buyer and each seller where a buyer price is lower than a seller price.

29. A system comprising:
- a processor; and
- a means for electronically matching at least one multi-attribute bid from one or more buyers and at least one multi-attribute bid from one or more sellers, wherein the means for matching includes:
  - means for electronically selecting a pair of bids between each buyer and each seller from a plurality of compatible bid pair combinations, the selected pair of bids having a highest surplus between each buyer bid and seller bid, each buyer and seller bid being based on at least one variance to a nominal attribute value of at least one attribute and a corresponding variance relative to the nominal bid value, wherein each buyer and seller bid is a price, the price being expressed in terms of a uniform measurement unit;
  - means for electronically generating a weighted bipartite graph comprising buyer nodes and seller nodes and an edge between each buyer node and each seller node, each edge having the highest surplus of the pair of bids between the buyer and seller as a weight; and
  - means for electronically determining maximal weighted matching bids from the highest surplus pairs of bids using the weighted bipartite graph.

30. A system comprising:
- a processor; and
- a computer-readable medium coupled to the processor, the computer-readable medium having instructions to cause the processor to match at least one multi-attribute bid from one or more buyers and at least one multi-attribute bid from one or more sellers, the instructions further to cause the processor to:
- select a pair of bids between each buyer and each seller from a plurality of compatible bid pair combinations, the selected pair of bids having a highest surplus between each buyer bid and seller bid, each buyer and seller bid being based on at least one variance to a nominal attribute value of at least one attribute and a corresponding variance relative to the nominal bid value, wherein each buyer and seller bid is a price, the price being expressed in terms of a uniform measurement unit;
- generate a weighted bipartite graph comprising buyer nodes and seller nodes and an edge between each buyer node and each seller node, each edge having the highest surplus of the pair of bids between the buyer and seller as a weight; and
- determine maximal weighted matching bids from the highest surplus pairs of bids using the weighted bipartite graph.

* * * * *